July 8, 1958 J. H. BORNZIN 2,842,045
VARIABLE FEED OPENING FOR HAY BALERS
Filed March 20, 1956
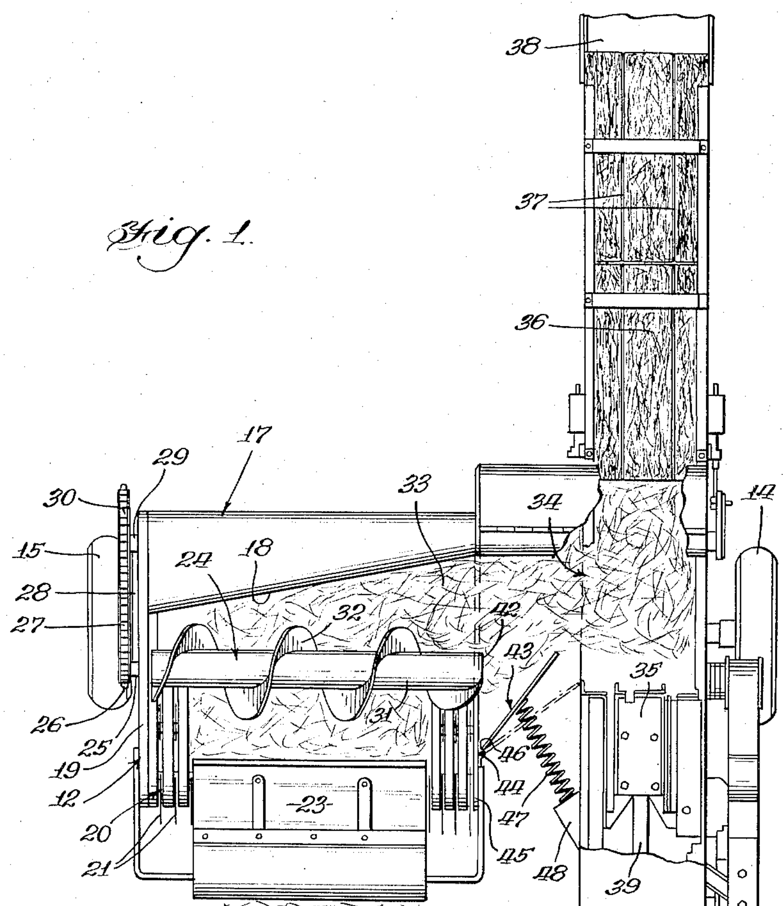
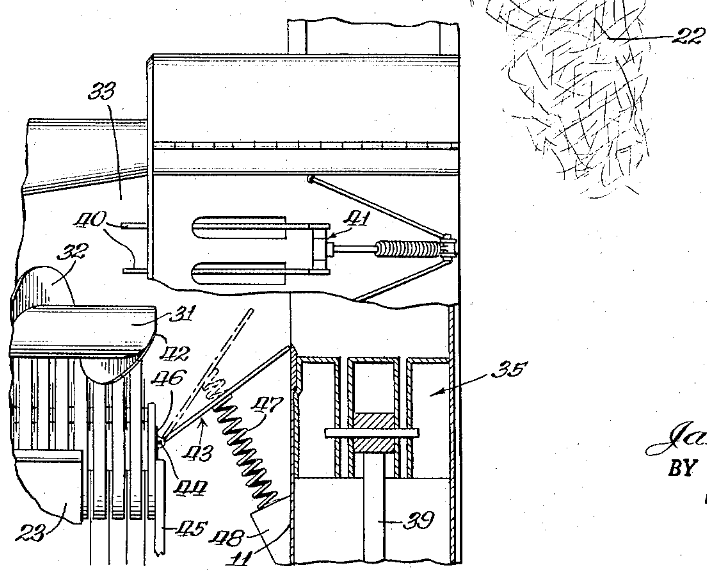
INVENTOR.
James H. Bornzin
BY Paul O. Pippel
Atty.

2,842,045

VARIABLE FEED OPENING FOR HAY BALERS

James H. Bornzin, La Grange, Ill., assignor to International Harvester Company, a corporation of New Jersey Application March 20, 1956, Serial No. 572,698

1 Claim. (Cl. 100—142)

This invention relates to a new and improved variable feed opening for hay balers.

The regular and coninuous flow of material to be baled from a windrow in the field to a bale-forming chamber has long been a problem in the baler art. Many devices have been employed to insure this uninterrupted and uniform feed of material to be baled into the bale-forming chamber. The variations in volume of material to be baled contributes to the difficulty in maintaining uniform flow of material. This problem was understood and solved to a considerable degree by the disclosures in the patent to Crumb et al., 2,450,082, granted Sept. 28, 1948. The present applicant has a common assignee with the assignee of the Crumb et al. patent. The present device thus enhances the hay flow characteristics of previous devices.

A principal object of the present invention is to provide a variable size feed opening for bale-forming chambers dependent upon the volume of hay to be baled at any given time.

Another important object of this invention is to supply intermediate a baler platform and the feed opening in a bale-forming chamber a yieldable wall member capable of exerting some predetermined pressure upon hay being transferred from the platform to the bale-forming chamber.

Still another important object of this invention lies in the provision of means in the form of a hinged wall intermediate the platform and bale-forming chamber of a hay baler and the wall being spring-biased whereupon the passageway between the platform and bale-forming chamber is varied directly depending upon the amount of hay being passed therethrough.

Another and still further important object of this invention is to equip a hay baler with a yieldable wall disposed at the end of a transversely feeding platform auger to normally urge the hay being fed rearwardly and angularly for proper positioning of hay in the path of packer fingers arranged to feed the hay into an opening in a bale-forming chamber.

Other and further important objects and advantages will become apparent from the disclosures in the following specification and accompanying drawings.

In the drawings:

Figure 1 is a top plan view with portions thereof broken away of a hay baler incorporating the present invention; and Figure 2 is an enlarged detail view of a portion of the device as shown in Figure 1 and with the parts thereof in slightly changed position due to increased quantities of hay being fed from the baler platform to the bale-forming chamber.

As shown in the drawings:

The reference numeral 10 indicates generally a hay baler having a generally longitudinally extending bale-forming chamber 11 and a laterally extending pickup platform 12. The forward end of the bale-forming chamber 11 has a tongue member 13 for attachment to the draw-bar of a tractor or the like. A wheel truck supports the central portion of the hay baler 10 and has laterally spaced-apart ground-engaging wheels 14 and 15.

The pickup platform 12 includes a generally horizontally disposed floor 16 and a back wall 17 having laterally inclined surface 18 at its forward end. An outer side wall 19 extends forwardly from the rear wall 17 for termination at the point of a pickup cylinder 20. The pickup cylinder 20 extends across the forward end of the platform and by means of spring fingers 21, hay 22 as shown in a windrow is picked upwardly and placed over the top of the cylinder 20 for deposit on the horizontal floor or deck 16 of the platform. A hold-down packer member 23 is adapted to ride on the hay 22 and maintain it in contact with the top of the cylinder 20 and to thereupon guide the hay rearwardly on the deck 16 of the platform 12 and beneath a horizontally disposed auger 24.

The auger 24 has a central shaft 25 which extends through an opening in the end wall 19 of the platform whereupon a sprocket 26 is affixed to the outer end for receiving drive by means of a chain 27. An arm 28 is arranged and constructed to support the shaft 25 about a hinge 29 spaced rearwardly of the auger and on which a driving sprocket 30 for the chain 27 is provided. Thus the auger 24 may have arcuate swinging movement in a generally vertical direction either toward or away from the surface 16 of the platform whereby various amounts of hay to be baled can be accommodated. The auger 24 further includes a generally large diameter core 31 mounted over the shaft 25 which in turn has a spiral screw flight 32 affixed thereto and arranged in such a manner that hay or other material to be baled which is delivered to the platform 12 will be carried beneath the auger 24 and fed laterally and longitudinally of its core 31 whereby the hay is aggregated on the platform in an area shown at 33. The auger 24 on the platform 12 moves hay under and rearwardly simultaneously with movement of the hay crosswise of the platform so that the hay congregates in the area 33 immediately prior to delivery through a side opening 34 in a vertical side wall of the bale-forming chamber 11.

The bale-forming chamber 11 includes a reciprocating plunger 35 which is adapted to move hay as it comes through the opening 34 rearwardly through the forming chamber. The hay is thereupon compressed into bales 36 and tied by means of strands 37 to effect a neat bale of hay. The rearward end 38 of the bale-forming chamber 11 constitutes the discharge opening for the completed and tied bales. The plunger 35 is provided with a pitman 39 for effecting the reciprocation of the plunger and the compression of the hay within the forming chamber.

Preliminary to forming the compressed bales of hay there is the problem of passing the hay from the area 33 through the side opening 34 and into the forming chamber 11. As best shown in Figure 2 this may be accomplished by means of oscillating or gyrating packer fingers 40 which reach out into the area 33 and sweep the hay across the remainder of the deck 16 and thence through the side opening 34 and into the bale-forming chamber. These packer fingers 40 are positioned adjacent the rearward portion of the auger 24 and are operated by a crank mechanism described in greater detail in the previous Crumb et al. Patent 2,450,082. It should be noted that the free unjournalled end 42 of the auger 24 is generally forwardly disposed from the opening 34 so that there is considerable reliance upon the tendency of the hay to be moved rearwardly of the platform by the auger simultaneously with its transverse movement across the platform.

An angularly disposed wall or partition member 43 is disposed in front of the end 42 of the auger 24 in such a manner that any hay delivered out from the end of the auger will be directed against this partition for delivering by sliding movement rearwardly into the path of travel of the gyrating packer fingers 49 for eventual delivery into the bale-forming chamber. The partition or wall member 43 is hinged at 44 on the inner side 45 of the platform 12 at a position forwardly of the front edge of the auger 24. The hinge member 44 has a forward extension 46 which is welded or otherwise fastened to the side 45 for securely supporting the partition wall 43 in an arcuate swinging manner from a position angling laterally and rearwardly from the side wall 45 of the platform. The location of the wall is such that all hay or other material discharged from the forward portion of the auger will be received thereby for deflection angularly rearwardly. A spring 47 is adapted to urge the wall 43 outwardly toward the area 33 and the wall 43 thus remains in this extended position until such a time as the volume of hay 22 passing through the platform becomes so great as to cause the spring 47 to be compressed as shown in Figure 2 whereupon greater quantities of hay may be accommodated on the platform without interferring with continued uninterrupted flow of hay from the windrow across the platform and into the bale-forming chamber. The spring 47 is carried on the projection 48 from the wall of the bale-forming chamber 11 and is diagonally positioned relative to the length of the hay baler and urges the wall 43 forwardly toward the space 33 from which material is carried into the bale forming chamber. It should thus be obvious from viewing Figures 1 and 2 that the space 33 is more or less restricted by the partition wall 43 when the hay being fed thereacross is relatively light in volume wherein when the hay becomes heavier and greater volume is passed through the machine the wall hinges outwardly to provide a larger opening for passage of greater quantities of hay into the bale-forming chamber. The wall 43 is thus automatically shiftable in response to the volume of hay and automatically compensates for changes in the amount of hay to be baled thereby adding to the efficiency of the hay baler feeder mechanism wherein the hay of any volume will be continuously fed to the bale forming chamber without interruption and yet be preliminary compressed at least to some degree by the spring biased wall 43.

In the operation of the hay baler of this invention a tractor is adapted to pull the machine through a field of windrowed hay. The cylinder pickup 20 grasps the hay in the windrow by its spring fingers 21 thereupon carrying the hay over the top of the cylinder and onto the platform deck 16. A hold-down packer member 23 guides the hay 22 as it is fed in a relatively mat-like manner to the space between the floating auger 24 and the deck 16. The auger 24 in combination with the laterally inclined or receding back wall 18 causes the hay 22 to converge on the platform in the area 33. If the hay is light the spring-biased wall 43 will be extended as shown in Figure 1 thus placing the hay in the packer finger feed zone. However, when the volume of hay is greater as shown in Figure 2 the wall 43 swings outwardly compressing the spring 47 thereupon enlarging the size of the bale-forming chamber side opening 34 to such an extent as to adequately receive the greater volume of hay. The baler of this invention thereby accommodates light or great amounts of hay in an efficient and uniform manner.

I am aware that numerous details of construction may be varied throughout a wide range without departing from the principles disclosed herein and I therefore do not propose limiting the patent granted hereon otherwise than as necessitated by the appended claim.

What is claimed is:

A mechanism assisting the feeding of various quantities of material to be baled from a platform to a bale-forming chamber in cooperation with an auger disposed generally transversely on the platform and unjournalled at its delivery end, and packer fingers movable through an area of the platform adjacent the rearward portion of the auger and thence through an opening disposed in and extending lengthwise of the bale-forming chamber, comprising a yieldable inclined wall hingedly mounted on said platform adjacent one end of the opening adjacent the unjournalled delivery end of the auger and forwardly thereof and arranged and constructed to position the hay laterally and rearwardly of the platform to the area adjacent the opening in the bale-forming chamber through which the packer fingers operate, and spring means normally urging said yieldable inclined wall toward a position in front of the unjournalled end of the auger and toward a position to constrict the length of the opening whereby the yieldable inclined wall automatically moves to position an optimum quantity of hay in the area through which the packer fingers operate when greater or lesser volumes of hay are fed therethrough, and to enlarge or restrict the size of the opening depending on the quantity of hay fed thereto.

References Cited in the file of this patent

UNITED STATES PATENTS

| | | |
|---|---|---|
| 2,450,082 | Crumb et al. | Sept. 28, 1948 |
| 2,626,698 | Appel | Jan. 27, 1953 |
| 2,674,839 | Russell | Apr. 13, 1954 |